United States Patent
Doong et al.

(10) Patent No.: US 7,007,100 B1
(45) Date of Patent: Feb. 28, 2006

(54) METHOD FOR SYNCHRONIZATION OF MULTICAST ROUTING TABLE CHANGES WITH A PLURALITY OF MULTICAST ROUTING PROTOCOLS

(75) Inventors: Janet Doong, Chelmsford, MA (US); Richard Crump, Boston, MA (US)

(73) Assignee: Nortel Networks Limited, (CA)

( * ) Notice: Subject to any disclaimer, the term of this patent is extended or adjusted under 35 U.S.C. 154(b) by 527 days.

(21) Appl. No.: 09/747,350

(22) Filed: Dec. 20, 2000

(51) Int. Cl.
*G06F 15/173* (2006.01)
*H04L 12/56* (2006.01)

(52) U.S. Cl. .................... 709/238; 709/245; 370/389; 370/400

(58) Field of Classification Search ............... 709/203, 709/216–219, 238, 242, 217, 239, 240, 245; 370/392, 390, 395.3, 395.31–3, 389–401
See application file for complete search history.

(56) References Cited

U.S. PATENT DOCUMENTS

| | | | | |
|---|---|---|---|---|
| 5,331,637 A | * | 7/1994 | Francis et al. ............... 370/408 |
| 6,154,463 A | * | 11/2000 | Aggarwal et al. .......... 370/408 |
| 6,192,051 B1 | * | 2/2001 | Lipman et al. ............. 370/389 |
| 6,327,242 B1 | * | 12/2001 | Amicangioli et al. ....... 370/216 |
| 6,373,826 B1 | * | 4/2002 | Russell et al. .............. 370/256 |
| 6,421,731 B1 | * | 7/2002 | Ciotti et al. ................ 709/238 |
| 6,457,059 B1 | * | 9/2002 | Kobayashi .................. 709/242 |
| 6,539,022 B1 | * | 3/2003 | Virgile ....................... 370/401 |
| 6,590,896 B1 | * | 7/2003 | Schrodi et al. ........ 370/395.52 |
| 6,643,706 B1 | * | 11/2003 | Marques et al. ............ 709/242 |
| 2003/0037167 A1 | * | 2/2003 | Garcia-Luna-Aceves et al. 709/238 |

* cited by examiner

*Primary Examiner*—Krisna Lim
*Assistant Examiner*—Yasin Barqadle
(74) *Attorney, Agent, or Firm*—Steubing McGuinness & Manaras LLP (57) ABSTRACT

A multicast network device, such as a route may support a plurality of multicast routing protocols. A single multicast routing table may be provided to store the multicast routes for each multicast routing protocol and a selected set of unicast routes from a unicast routing table. In order to synchronize route changes in the multicast routing table with the plurality of multicast routing protocols, a route ID value is assigned to each route in the multicast routing table. Each multicast routing protocol is assigned a bookmark in a route change queue, where the bookmark is assigned the route ID value of the last route processed by the multicast routing protocol. When a route is changed, the route is assigned a new route ID value and stored in the route change queue. A multicast routing protocol may determine if a route change has occurred by comparing its bookmark to the highest route ID value in the route change queue.

11 Claims, 11 Drawing Sheets

```
wfIpMrtmInjectRtTable OBJECT-TYPE
        SYNTAX   SEQUENCE OF WfIpMrtmInjectRtEntry
        ACCESS   not-accessible
        STATUS   mandatory
        DESCRIPTION
                "The Table of MRTM Inject Unicast routes Policy Rules"
        ::= { wfIpPolicyGroup 21 } wfIpMrtmInjectRtEntry OBJECT-TYPE
    SYNTAX   WfIpMrtmInjectRtEntry
    ACCESS   not-accessible
    STATUS   mandatory
    DESCRIPTION
            "An entry in the Mrtm Inject Route Rule Table"
    INDEX    { wfIpMrtmInjectRtIndex }
    ::= { wfIpMrtmInjectRtTable 1 }

WfIpMrtmInjectRtEntry ::= SEQUENCE {
        wfIpMrtmInjectRtDelete
            INTEGER,
        wfIpMrtmInjectRtDisable
            INTEGER,
        wfIpMrtmInjectRtIndex
            INTEGER,
        wfIpMrtmInjectRtName
            DisplayString,
        wfIpMrtmInjectRtNetworks
            OCTET STRING,
        wfIpMrtmInjectRtAction
            INTEGER,
        wfIpMrtmInjectRtPreference
            INTEGER,
        wfIpMrtmInjectRtPrecedence
            INTEGER,
        wfIpMrtmInjectRtInject
            OCTET STRING,
        wfIpMrtmInjectRtInInterface
            OCTET STRING,
        wfIpMrtmInjectRtType
            INTEGER,
        wfIpMrtmInjectRtMetric
            INTEGER
    } wfIpMrtmInjectRtDelete OBJECT-TYPE
        SYNTAX   INTEGER {
                    create (1),
                    delete (2)
                }
        ACCESS   read-write
        STATUS   mandatory
        DESCRIPTION
                "Create/Delete parameter."
        DEFVAL   { create }
        ::= { wfIpMrtmInjectRtEntry 1 }
```

FIG. 5A

```
wfIpMrtmInjectRtDisable OBJECT-TYPE
    SYNTAX  INTEGER {
                enabled (1), disabled (2)
            }
    ACCESS  read-write
    STATUS  mandatory
    DESCRIPTION
            "Enable/Disable parameter."
    DEFVAL  { enabled }
    ::= { wfIpMrtmInjectRtEntry 2 } wfIpMrtmInjectRtIndex OBJECT-TYPE
    SYNTAX  INTEGER
    ACCESS  read-only
    STATUS  mandatory
    DESCRIPTION
                "Rule index number"
        ::= { wfIpMrtmInjectRtEntry 3 } wfIpMrtmInjectRtName OBJECT-TYPE
    SYNTAX  DisplayString
    ACCESS  read-write
    STATUS  mandatory
    DESCRIPTION
                "Rule name - user specified name for this rule"
        ::= { wfIpMrtmInjectRtEntry 4 } wfIpMrtmInjectRtNetworks OBJECT-TYPE
    SYNTAX  OCTET STRING
    ACCESS  read-write
    STATUS  mandatory
    DESCRIPTION
            "Network identification list. This identifies which
            networks will match this rule.  If non-null, the octet
            string contains one or more 3-tuples of this form:

first octet:  exact (1) or range (2)
              next 4 octets:  network number
              next 4 octets:  network mask An entry with an 'exact' tag means to only match the
            specific network advertisement (number & mask). An
            entry with a 'range' tag means to match any network
            number that falls in the range indicated by the number
            and mask.

A null string also means 'match any route'."

::= { wfIpMrtmInjectRtEntry 5 }
```

*FIG. 5B*

```
wfIpMrtmInjectRtAction OBJECT-TYPE
    SYNTAX  INTEGER {
                accept (1),
                ignore (3)
            }
    ACCESS  read-write
    STATUS  mandatory
    DESCRIPTION
            "action. 'accept' means that the route should be imported from RTM to the Mrtm routing table. 'ignore'
            means don't consider the route"
    DEFVAL  { accept }
    ::= { wfIpMrtmInjectRtEntry 6 } wfIpMrtmInjectRtPreference OBJECT-TYPE
    SYNTAX  INTEGER(0..16)
    ACCESS  read-write
    STATUS  mandatory
    DESCRIPTION
            "preference. This is a metric to be used to compare
            the preference path between inject route or the existing
            route in Mrtm routing table. If the injecting unicast
            route is preferred, then the value need to be set higher than
            the preference of the existing route.
            If the injecting unicast route path is preferred,
                    then the value need to be set greater than 0.
            This parameter only has meaning if the action is 'accept'."
    DEFVAL  { 1 }
    ::= { wfIpMrtmInjectRtEntry 7 } wfIpMrtmInjectRtPrecedence OBJECT-TYPE
    SYNTAX  INTEGER
    ACCESS  read-write
    STATUS  mandatory
    DESCRIPTION
            "precedence. This is a metric to be used to compare
            this policy rule to the other rules that a given route may
            match. A rule with a higher precedence value will be
            chosen over one with a smaller value. In the case of
            a tie, the rule index is used (larger wins).

Note that the policy match is not most specific
            so the precedence has to be used to select from
            multiple matches."
    ::= { wfIpMrtmInjectRtEntry 8 }
```

*FIG. 5C*

```
wfIpMrtmInjectRtInject OBJECT-TYPE
    SYNTAX  OCTET STRING
    ACCESS  read-write
    STATUS  mandatory
    DESCRIPTION
            "network injection list. this octet string should only be
            non-null if the action is 'accept' and if it is desired to
            insert networks into the routing table that differ from
            the actual advertised network.  For instance, if a number of
            networks in a certain range are learned, an aggregate
            advertisement could be inserted instead of the individual
            networks."

If non-null, The octet string contains one 2-tuples of
            this form:

first  4 octets: network number
            next   4 octets: network mask

Upon receiving a route that matches this filter, the network
            in this list will be considered for the inclusion in the routing
            table.  If the list is null, the actual received network is considered."
    ::= { wfIpMrtmInjectRtEntry 9 } wfIpMrtmInjectRtInInterface OBJECT-TYPE
    SYNTAX  OCTET STRING
    ACCESS  read-write
    STATUS  mandatory
    DESCRIPTION
            "Injected unicast routes inbound circuit list.
            This octet string contains one or more 4-octet IP addresses.
            If an interface address is included in this list, the unicast
            routes received on that interface match this rule will be
            accepted.

If null, this filter applies to the unicast routes received on
            any interface."
    ::= { wfIpMrtmInjectRtEntry 10 }
```

*FIG. 5D*

```
wfIpMrtmInjectRtType OBJECT-TYPE
    SYNTAX  INTEGER {
            static-route (1),
            rip (15),
            egp (16),
            ospf (17),
            bgp (18),
            direct-route (40),
            best-route (41),
            all-route (42)
            }
    ACCESS  read-write
    STATUS  mandatory
    DESCRIPTION
            "Select the injected route type from RTM. The value of each
            route type will be the same as unitcast route type. See
            define in ip_rt_types.h"
    DEFVAL  { best route }
    ::= { wfIpMrtmInjectRtEntry 11 } wfIpMrtmInjectRtMetric OBJECT-TYPE
    SYNTAX  INTEGER (1..31)
    ACCESS  read-write
    STATUS  mandatory
    DESCRIPTION
            "Route Metric. This value represents the cost of the external
            routes which are OSPF or unicast best route  to be injected
            into Mrtm routing table. The default value is set to 1."

DEFVAL  { 1 }
    ::= { wfIpMrtmInjectRtEntry 12 } wfMrtm      OBJECT IDENTIFIER ::= { wfMrtmGroup 1 } wfMrtmCreate  OBJECT-TYPE
    SYNTAX  INTEGER {
            created (1),
            deleted (2)
            }
    ACCESS  read-write
    STATUS  mandatory
    DESCRIPTION
            "Create/Delete a parameter. Default is created.
            Users perform a set operation on this
            object in order to create/delete MRTM table."
    DEFVAL  { created }
    ::= { wfMrtm 1 }
```

*FIG. 5E*

```
wfMrtmEnable  OBJECT-TYPE
    SYNTAX  INTEGER  {
            enabled (1),
            disabled (2)
            }
    ACCESS  read-write
    STATUS  mandatory
    DESCRIPTION
            "Enable/Disable parameter indicates whether
            this MRTM record is enabled or disabled."
    DEFVAL  { enabled }
    ::= { wfMrtm 2 } wfMrtmState  OBJECT-TYPE
    SYNTAX  INTEGER  {
              up (1),
              down (2),
              init (3),
              notpres (4)
            }
    ACCESS  read-only
    STATUS  mandatory
    DESCRIPTION
            "The current state of the entire MRTM."
    DEFVAL  { notpres }
    ::= { wfMrtm 3 } wfMrtmDebug  OBJECT-TYPE
    SYNTAX  INTEGER
    ACCESS  read-write
    STATUS  mandatory
    DESCRIPTION
            "This is a debug field for PGM.  Setting bits
            cause PGM to generate certain log messages.
            This field will NOT restart PGM.
            The follow bits maybe set in any combination
            (LS stands for least significant) :

0x00000001 for no display
            0x00000002 for interface to RTM
            0x00000004 for interface to policy
            0x00000008 for interface to multicast protocols
            0x00000010 for route change or add or delete.
    ::= { wfMrtm 4 }
```

```
wfMrtmHoldDown  OBJECT-TYPE
      SYNTAX  INTEGER (10..60)
      ACCESS  read-write
      STATUS  mandatory
      DESCRIPTION "This value specifies, in seconds, how long a route
            will be held in MRTM table after it becomes unreachable."
DEFVAL   { 10 }
::= { wfMrtm 5 } wfMrtmFifoSize  OBJECT-TYPE
SYNTAX  INTEGER (1..100)
ACCESS  read-write
STATUS  mandatory
DESCRIPTION
            "This value represents the depth of the FIFO
            between RTM and MRTM used for the outstanding route changes.
            The memory will be pre-allocated as the size of
            x times 1000 of FIFO route entry."
DEFVAL   { 5 }
::= { wfMrtm 6 } wfMrtmEstimatedNetworks  OBJECT-TYPE
      SYNTAX  INTEGER (10..200000)
      ACCESS  read-write
      STATUS  mandatory
      DESCRIPTION
               "This parameter indicates the estimated number of routes
               per slot that the router will need to keep in its routing
               table.This value is used for pre-allocating routing tables."
         ::= { wfMrtm 7 } wfMrtmMaxRoutes  OBJECT-TYPE
      SYNTAX  INTEGER
      ACCESS  read-write
      STATUS  mandatory
      DESCRIPTION
            "Max number of routes, per slot. This is used to limit
            the size of routing tables. Note that routes are kept on a
            per-source network basis, independent of multicast group."
      ::= { wfMrtm 8 } wfMrtmActualRoutes  OBJECT-TYPE
      SYNTAX  INTEGER
      ACCESS  read-only
      STATUS  mandatory
      DESCRIPTION
            "Total actual entries currently in the routing table"
      ::= { wfMrtm 9 }
```

METHOD FOR SYNCHRONIZATION OF MULTICAST ROUTING TABLE CHANGES WITH A PLURALITY OF MULTICAST ROUTING PROTOCOLS

CROSS-REFERENCE TO RELATED APPLICATION

This patent application may be related to the following commonly-owned United States patent application, which is hereby incorporated by reference in its entirety.

U.S. patent application Ser. No. 09/742,881, entitled METHOD, APPARATUS AND SYSTEM FOR MANAGEMENT OF MULTICAST ROUTES FOR A PLURALITY OF ROUTING PROTOCOLS IN A NETWORK DEVICE, filed on even date herewith in the names of Janet Doong, Richard Crump, and Michael Kinzlmair.

FIELD OF THE INVENTION

The invention generally relates to communication networks and, more particularly, the invention relates to the synchronization of changes to routes in a multicast routing table with a plurality of multicast routing protocols.

BACKGROUND OF THE INVENTION

Communication networks may be used to transport information from an information provider to one or more different consumers. A technique known as "multicasting" may be used to send information from an information provider to a select group of consumers over the communication network. Multicasting allows the information provider to transmit a packet of multicast information (herein referred to as a "multicast packet") simultaneously to all consumers in the multicast group. The multicast packet is addressed to the multicast group using a multicast address. Examples of multicasting are sending an e-mail message to a mailing list, teleconferencing and videoconferencing.

Figure 1:
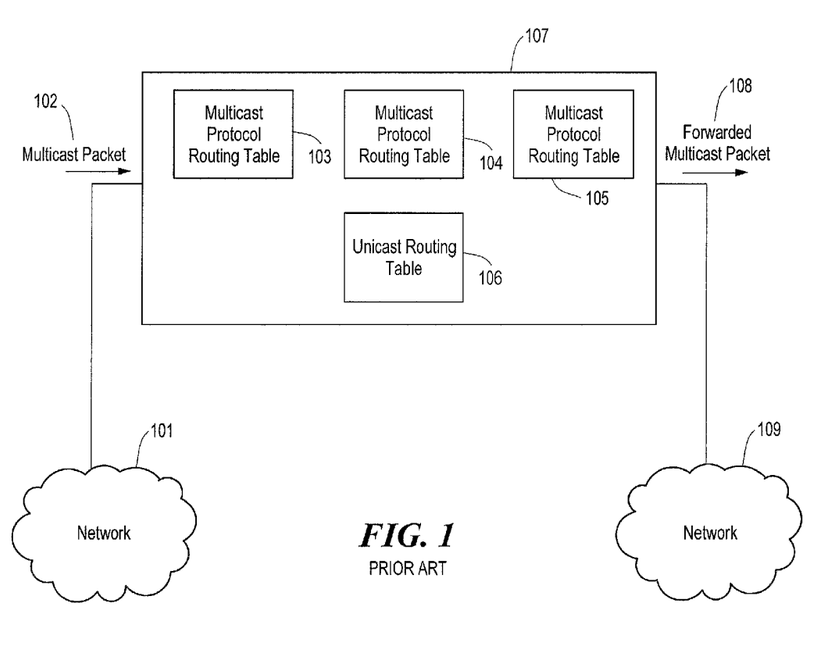
FIG. 1 is a schematic block diagram of an exemplary prior art network device in a multicast communication network.

FIG. 1 is a block diagram of an exemplary prior art network device 107 in a multicast communication network. When a multicast packet is received from a network 101 by the network device, such as a router 107, to be forwarded, the routes associated with the multicast packet need to be determined by the network device. A multicast routing protocol associated with the multicast packet is used to determine the best route for the multicast packet. Examples of multicast routing protocols are Distance Vector Multicast Routing Protocol (DVMRP), Multiprotocol extensions to Border Gateway Protocol (MBGP), Multicast Open Shortest Path First (MOSPF), and Protocol Independent Multicast (PIM). As shown in FIG. 1, each multicast routing protocol supported by the router 107 typically has its own independently maintained routing table 103–105 that stores the multicast routes known to the specific multicast routing protocol. Each supported multicast routing protocol maintains its own routing table by exchanging route update messages through its own multicast networks. Some multicast routing protocols, such as MOSPF and PIM, also make use of unicast routes from the unicast protocols supported by the router 107. The supported unicast routing protocols have a unicast routing table 106, as shown in FIG. 1, that stores the unicast routes known to the unicast routing protocols supported by the router. Examples of unicast protocols are Border Gateway Protocol (BGP), Open Shortest Path First (OSPF) and Routing Information Protocol (RIP).

As mentioned above, when a multicast packet is received by the router 107 to be forwarded, the router 107 needs to determine the routes associated with the multicast packet. The multicast routing protocol associated with the multicast packet will determine the order in which the multicast routing tables 103–105, as well as the unicast routing table if necessary, are accessed and searched to determine the desired route or routes for the multicast packet. Often, each multicast routing table 103–105, as well as the unicast routing table, must be accessed and searched to determine the correct route or routes for the multicast packet. Performing multiple searches involves a significant amount of logic and processing time. In addition, when more than one multicast routing protocol is supported by the router, addition interoperability logic is required to enable the different multicast routing protocols to exchange routing information. The interoperability logic permits the multicast routing protocol to import the routing information of the other multicast routing protocols so that each routing protocol may propagate the other's routes in its own network domain.

SUMMARY OF THE INVENTION

In accordance with one aspect of the invention, a method for synchronizing a route change in a routing table with a plurality of multicast routing protocols in a network device in a communication network includes assigning a route ID value to each route in the routing table and assigning a bookmark in a route change queue to each multicast routing protocol where the bookmark has a value equivalent to the route ID value of the last route processed by the multicast routing protocol. A new route ID value is assigned to each route changed in the routing table and each route changed is stored in the route change queue. The bookmark value of each multicast routing protocol is compared to the highest route ID in the route change queue. The route change may be the addition of a new route to the routing table. The route change may also be deleting a route from the routing table or updating a route in the routing table. In one embodiment, the method further includes processing routes in the route change queue with route ID values greater than the bookmark value of the multicast routing protocol.

In accordance with another aspect of the invention, a route entry for a route in a routing table for a plurality of multicast routing protocols includes an address for the route source network, an address for the next hop of the route, an address for the next hop interface of the route, a route state value for indicating the current state of the route, a routing protocol identifier for identifying the routing protocol associated with the route, and a route ID value for determining when the route entry has been processed by each of the plurality of multicast routing protocols.

Further embodiments of the invention are implemented as a computer program products having a computer useable medium with computer readable program code thereon. The computer readable code may be read and utilized by a computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

An embodiment of the invention synchronizes a route change in a routing table with a plurality of multicast routing protocols in a network device in a communication network. Each route in the routing table is assigned a route ID value. When a multicast routing protocol accesses the routing table for the first time, the multicast routing protocol traverses the routing table and processes each route from the route with the lowest route ID value to the route with the highest route ID value. After the multicast routing protocol has completed processing the routes in the routing table, the multicast routing protocol is assigned bookmark that is placed in a route change queue. The bookmark is assigned a value equivalent to the route ID value of the last route processed by the multicast routing protocol. When a route in the routing table is changed (i.e., added, deleted or updated), the route is assigned the next highest route ID value and the route is stored at the end of the route change queue as well as in the routing table. Each multicast routing protocol will compare its bookmark value to the highest route ID value in the route change queue to determine if any changes have occurred. If the multicast routing protocol's bookmark value is less than the highest route ID value in the route change queue then the multicast routing protocol will process the route changes.

Figure 2:
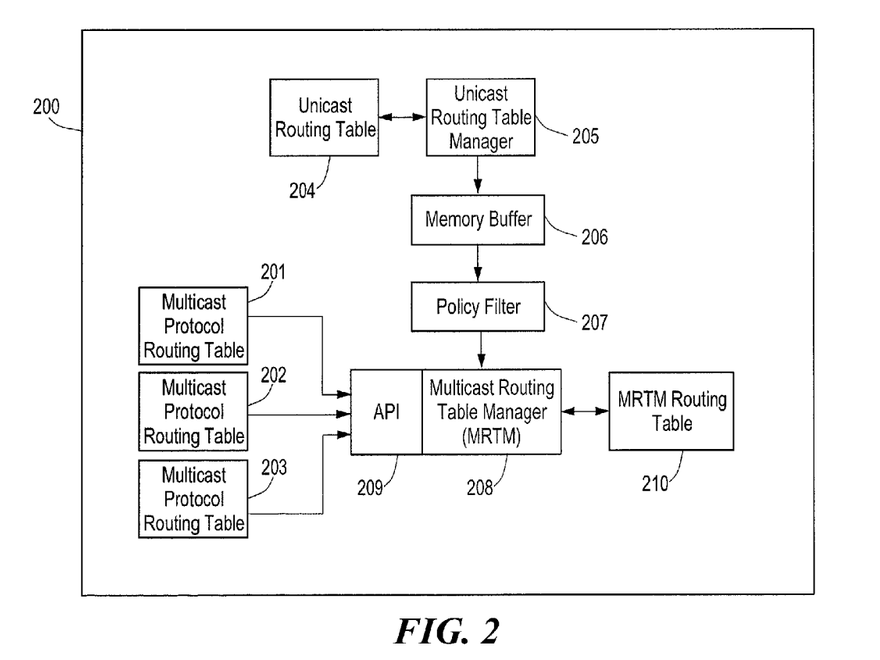
FIG. 2 is a schematic block diagram of a network device including an apparatus for managing routing information for a plurality of multicast routing protocols in accordance with an embodiment of the invention.

FIG. 2 is a schematic block diagram of a network device including an apparatus for managing routing information for a plurality of multicast routing protocols. The router 200 receives multicast packets from a previous network device and forwards the multicast packets to the next hop of the desired route for the multicast packet.

Router 200 supports a plurality of multicast routing protocols. As discussed above, a multicast routing protocol, such as DVMRP and MBGP, maintains its own routing table that stores the multicast routes known to the multicast routing protocol. Accordingly, router 200 will include an independently maintained routing table 201–203 for each multicast routing protocol supported by the router. In addition, router 200 includes a unicast routing table 204 that stores unicast routes for each unicast routing protocol supported by the router, such as, for example, RIP or OSPF. As mentioned above with respect to FIG. 1, some multicast routing protocols, such as MOSPF and PIM, make use of unicast routes, as well as multicast routes. The unicast routing table 204 is controlled by unicast routing table management logic (RTM) 205.

When router 200 receives a multicast packet to be forwarded, the multicast routing protocol associated with the multicast packet determines the best route or routes for the multicast packet. The multicast routing protocol determines the desired route or routes for the multicast packet by accessing and searching the multicast routing protocol routing tables 201–203 and the unicast routing table 204, if necessary. As discussed previously, often more than one routing table will need to be searched in order to locate the best route or routes. Searching multiple routing tables requires a significant amount of processing time and logic. In order to efficiently access and search the routes known by each supported multicast and unicast routing protocol, router 200 advantageously includes a multicast routing table manager (MRTM) 208 and an associated MRTM routing table 210. The MRTM routing table 210 stores the multicast routes from each multicast protocol routing table 201–203, as well as selected unicast routes from the unicast routing table 204. In this manner, the MRTM provides a common location where all multicast routing protocol routing information may be obtained. The MRTM routing table may be used by each supported multicast routing protocol to access and exchange information with the other supported multicast routing protocols. When the router 200 forwards a multicast packet, only the MRTM routing table 210 must be searched to determine the desired route or routes for the multicast packet.

The content of the MRTM routing table 210 is controlled by the MRTM 208 in conjunction with an application program interface (API) 209 and a management information base (MIB) (not shown). Each multicast protocol routing table 201–203 submits its multicast routes directly to the MRTM 208 via the API 209. The API 209, in connection with the MRTM 208, provides the processes and logic to insert routes into the MRTM routing table, delete routes from the MRTM routing table and change routes in the MRTM routing table.

When a multicast route is submitted to the MRTM 208 via the API 209, the MRTM 208 will determine whether the multicast route should be added, deleted or updated. The MRTM 208 searches the existing MRTM routing table 210 to determine if the submitted multicast route already has an entry in the MRTM routing table 210. If an entry for the specific multicast route already exists, the MRTM 208 will update the route entry with any changes to the parameters of the multicast route. If an entry for the specific multicast route does not exist and the route weight associated with the multicast route is not unreachable, then a new entry is created in the MRTM routing table 210 for the submitted route. A route will be removed from the MRTM routing table when the network associated with the route becomes unreachable.

When a route entry is added to the MRTM routing table 210, the MRTM 208 sorts the route submitted based on the address of the route and the type of routing protocol associated with the route. A preference is associated with each routing protocol. The route entries of the MRTM routing table 210 are stored in descending order based on preference, i.e., which route is a preferred path. In addition, the MRTM 208 will identify the best route based on the preferences associated with each routing protocol.

As mentioned above, when a submitted multicast route is added to the MRTM routing table 210, a route entry is created to store the routing information associated with the submitted multicast route. In an exemplary embodiment of the invention, an entry in the MRTM routing table includes information such as, the IP address of the route source network, the IP address of thee next hop of the route, the current route state, the current route metric and the routing protocol associated with the route.

The MRTM routing table 210 may also include selected unicast routes from the unicast routing table 204. As discussed previously, some multicast routing protocols make use of unicast routes, as well as multicast routes. The unicast routing table 204, however, does not directly submit its routes to the MRTM routing table 210. Alternatively, the unicast routes are selectively injected into the MRTM routing table 210 using a memory buffer 206 and a policy filter 207 coupled between the unicast routing table 204 and the MRTM routing table 210.

Figure 3:
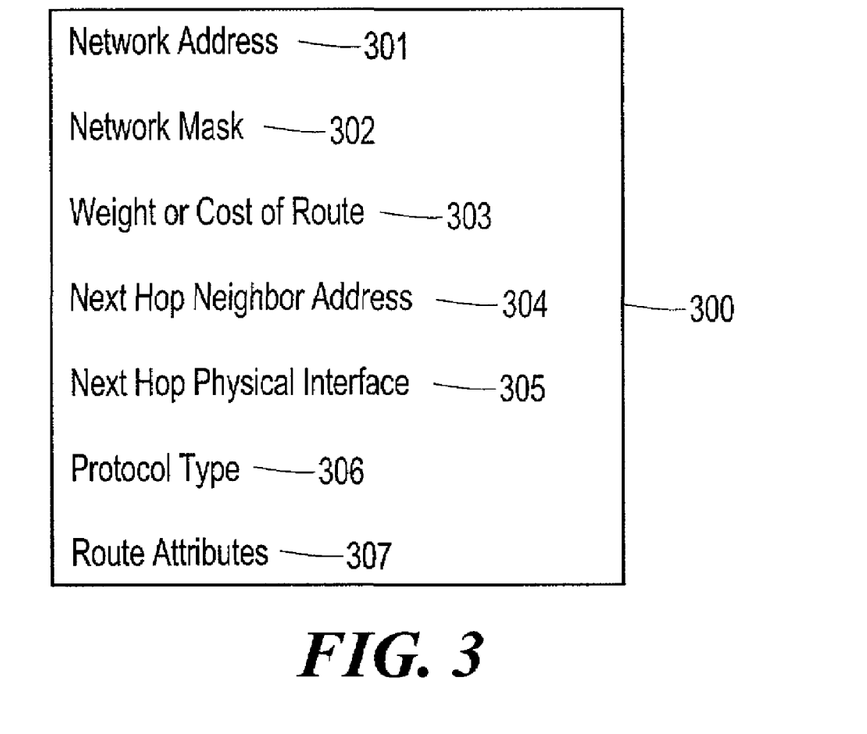
FIG. 3 illustrates an exemplary entry in a memory buffer used to transfer unicast routes to a multicast routing table in accordance with an embodiment of the invention.

The memory buffer 206 is used to transfer the best unicast routes from the unicast routing table 204 to the MRTM routing table 210. In one embodiment, the memory buffer 206 is a FIFO. The MRTM 208 requests from the RTM 205 a set of unicast routes that should be stored in the memory buffer 206. In one embodiment, the unicast routes are selected based on the type of protocol associated with the route. The desired protocol type is identified as "requested" by the MRTM 208. The RTM 205 will then submit the unicast routes associated with that protocol type to the memory buffer 206. Each selected unicast route is stored in the memory buffer 206 using a memory record that preferably contains a minimal amount of routing information. FIG. 3 illustrates an exemplary record in the memory buffer used to transfer unicast routes to a multicast routing table in accordance with an embodiment of the invention.

The memory record 300 stores information related to a unicast route such as network address 301, network mask 302, the weight or cost of the route 303, the next hop neighbor address 304 for the route, the next hop physical interface 305 for the route, the protocol type 306 and the route attributes 307. The information stored in the memory record 300 may be used to modify the attributes of the unicast route using a policy filter 207. Returning to FIG. 2, the MRTM sends the unicast routes stored in the memory buffer to the policy filter 207. In one embodiment, the policy filter 207 may be used to remove selected routes or modify the weight or cost value of each route. As discussed above, the weight or preference of the route is used by the MRTM 208 to sort the routes stored in the MRTM routing table 210.

The MRTM 208 reads the stored unicast information from the memory buffer 206 and, as it does with the submitted multicast routes, then determines whether the unicast route should be added, deleted, or updated. The MRTM 208 searches the existing MRTM routing table 210 to determine if the submitted unicast route already has an entry in the MRTM routing table 210. If an entry for the unicast route already exists, the MRTM 208 will update the route entry with any changes to the unicast route. If an entry for the unicast route does not exist and the route weight associated with the unicast route is not unreachable, then a new entry is created in the MRTM routing table 210 for the injected unicast route. As discussed previously, a route will be removed from the MRTM routing table 210 when the network associated with the unicast route becomes unreachable.

As the routes, multicast or unicast, in the MRTM routing table are changed (i.e., updated, added or deleted), each multicast routing protocol using the MRTM routing table will be notified of such change. It is advantageous to synchronize any route changes in the MRTM routing table with the plurality of multicast routing protocols using the MRTM routing table. For example, when a route is being deleted from the MRTM routing table, each multicast routing protocol needs to be notified that the route is going to be deleted before the MRTM actually deletes the route from the MRTM routing table. If the deletion of the route is not synchronized with the multicast routing protocols, a particular multicast routing protocol may still be using the route even after it has been deleted from the routing table. In other words, without synchronization of route changes, slower multicast routing protocols could access routes that are no longer in the MRTM routing table.

Figure 4:
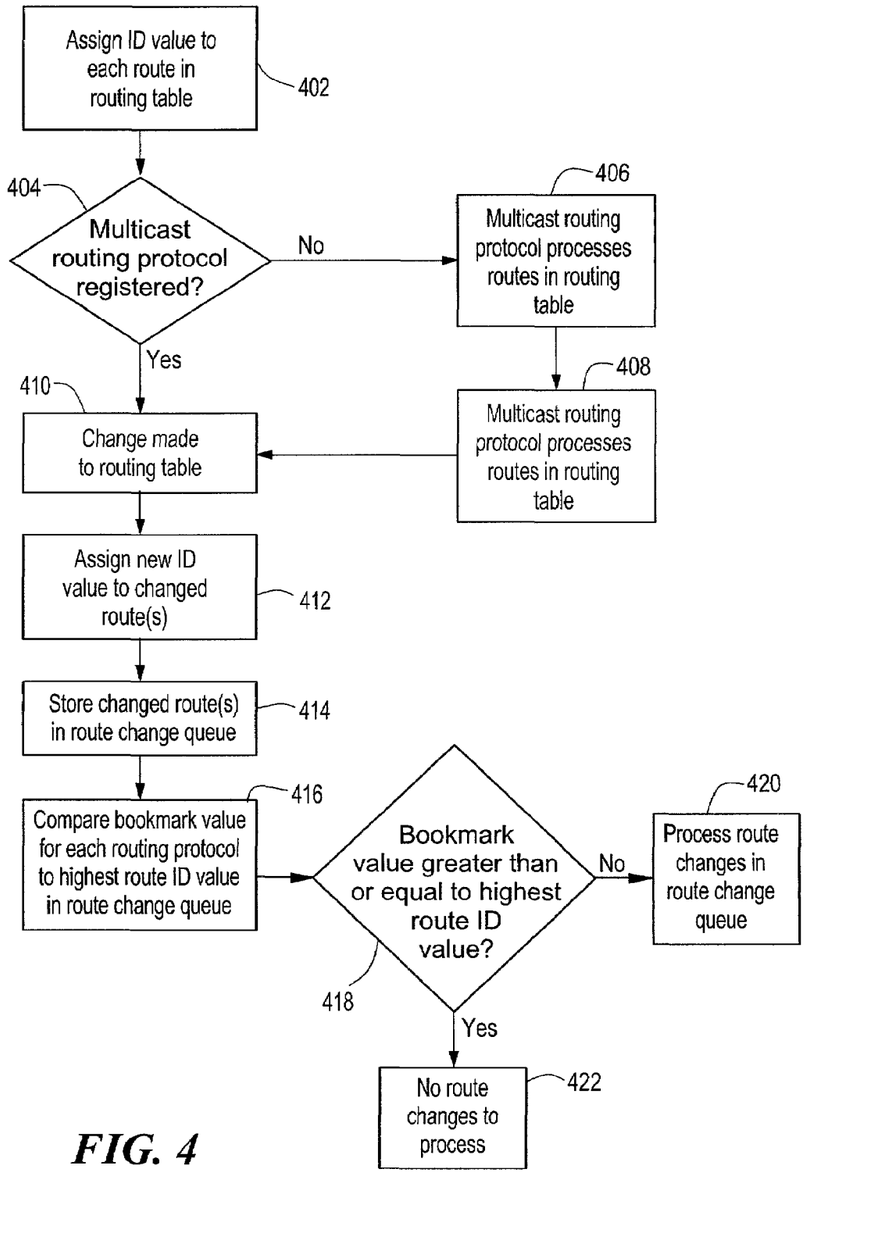
FIG. 4 illustrates the flow of control of a method for synchronizing route changes in a multicast routing table with a plurality of multicast routing protocols in accordance with an embodiment of the invention.

FIG. 4 illustrates the flow of control of a method for synchronizing route changes in a routing table with a plurality of multicast routing protocols. At block 402, an ID value is assigned to each route (multicast or unicast) in the MRTM routing table. These ID values are used by the MRTM routing table and each multicast routing protocol that uses the MRTM routing table to determine whether any route changes have been made in the MRTM routing table. When a multicast routing protocol first accesses the MRTM routing table to search and process the routes in the routing table, the multicast routing protocol will register with the MRTM. At clock 404, if the multicast routing protocol has not registered with the MRTM, the multicast routing protocol will process the routes in the routing table at block 406. Once the multicast routing protocol has processed the routes in the routing table, the multicast routing protocol is assigned a bookmark in a route change queue at block 408. The bookmark for the multicast routing protocol is assigned a value equivalent to the route ID value of the last route processed by the multicast routing protocol. Once the multicast routing protocol has registered with the MRTM (i.e, has processed the routing table for the first time), the multicast routing protocol may use the bookmark and the route change queue to determine if any route changes have been made to the routing table.

At block 410, a change is made to a route in the MRTM routing table. The change could be adding a new route, deleting a route or updating a route. Whenever a change is made, the new route (if added) or existing route (if deleted or updated) is assigned the next highest route ID value at block 412 and is added to the route change queue. The changed route is stored both in the routing table and at the end of the route change queue at block 414. When a multicast routing protocol checks to determine if there has been a route change in the MRTM routing table, the current bookmark value for the multicast routing protocol is compared to the highest route ID value in the route change queue at block 416. If the value of the multicast routing protocol's bookmark is greater than or equal to the highest route ID value in the route change queue at block 418, then there have been no route changes in the MRTM routing table that need to be processed by the multicast routing protocol at block 422. If the value of the multicast routing protocol's bookmark is not greater than or equal to the highest route ID value in the route change queue at block 418, then there have been route changes that must be processed by the multicast routing protocol at block 422. The multicast routing protocol will then process the changed routes in the route change queue at clock 422. Once the multicast routing protocol has processed the route changes in the route change queue, the value of the bookmark is assigned the route ID value of the last route that was processed in the route change queue.

The use of route ID values and the route change queue also enables the MRTM to determine when all of the multicast routing protocols using the MRTM routing table have processed a route change. When the bookmark in the route change queue for each multicast routing protocol has a value greater than or equal to the route ID value for the changed route, the multicast routing protocol has processed the route change. In this manner, the MRTM may, for example, advantageously determine when all of the multicast routing protocols have finished using a route before it is deleted from the routing table.

In an exemplary embodiment of the invention, the MRTM is managed through a Management Information Base (MIB). The MIB defines various management objects for configuring and controlling various multicast route management functions. Specifically, an exemplary MIB defines management objects for configuring and controlling the selection and injection of unicast routes, the submission of multicast routes and the creation of a MRTM routing table.

An exemplary MIB for configuring and controlling the MRTM is shown in FIGS. 5A–5G. The MIB defines various management objects, some of which are organized as tables within the MIB. Specifically the MIB defines a MRTM Inject Route Table (wfIpMrtmInjectRtTable) and a MRTM routing table (wfMRTM).

The MRTM Inject Route Table (wfIpMrtmInjectRtTable) is used to configure and control the policy rules governing the injection of unicast routes into the MRTM routing table. Each MRTM Inject Route Table entry corresponds to a particular unicast route injection policy rule, and includes a management object (wfIpMrtmInjectRtDelete) to create a or delete a route entry, a management object (wfIpMrtmInjectRtDisable) to enable or disable a route entry, a management object (wfIpMrtmInjectRtIndex) indicating a rule index number, a management object (wfIpMrtmInjectRtName) indicating the specified name for the rule, a management object (wfIpMrtmInjectRtNetworks) indicating the list of networks that match the rule, a management object (wfIpMrtmInjectRtAction) to accept or ignore a route, a management object (wfIpMrtmInjectRtPreference) indicating the preference associated with a route, a management object (wfIpMrtmInjectRtPrecedence) indicating a precedence value for the rule, a management object (wfIpMrtmInjectRtInject) indicating a network replacement list, a management object (wfIpMrtmInjectRtInterface) indicating an injected unicast routes inbound circuit, a management object (wfIpMrtmInjectRtType) indicating a unicast route type to be selected from the RTM, and a management object (wfIpMrtmInjectRt Metric) indicating the cost of the route to be injected into the MRTM routing table.

Figure 5A:
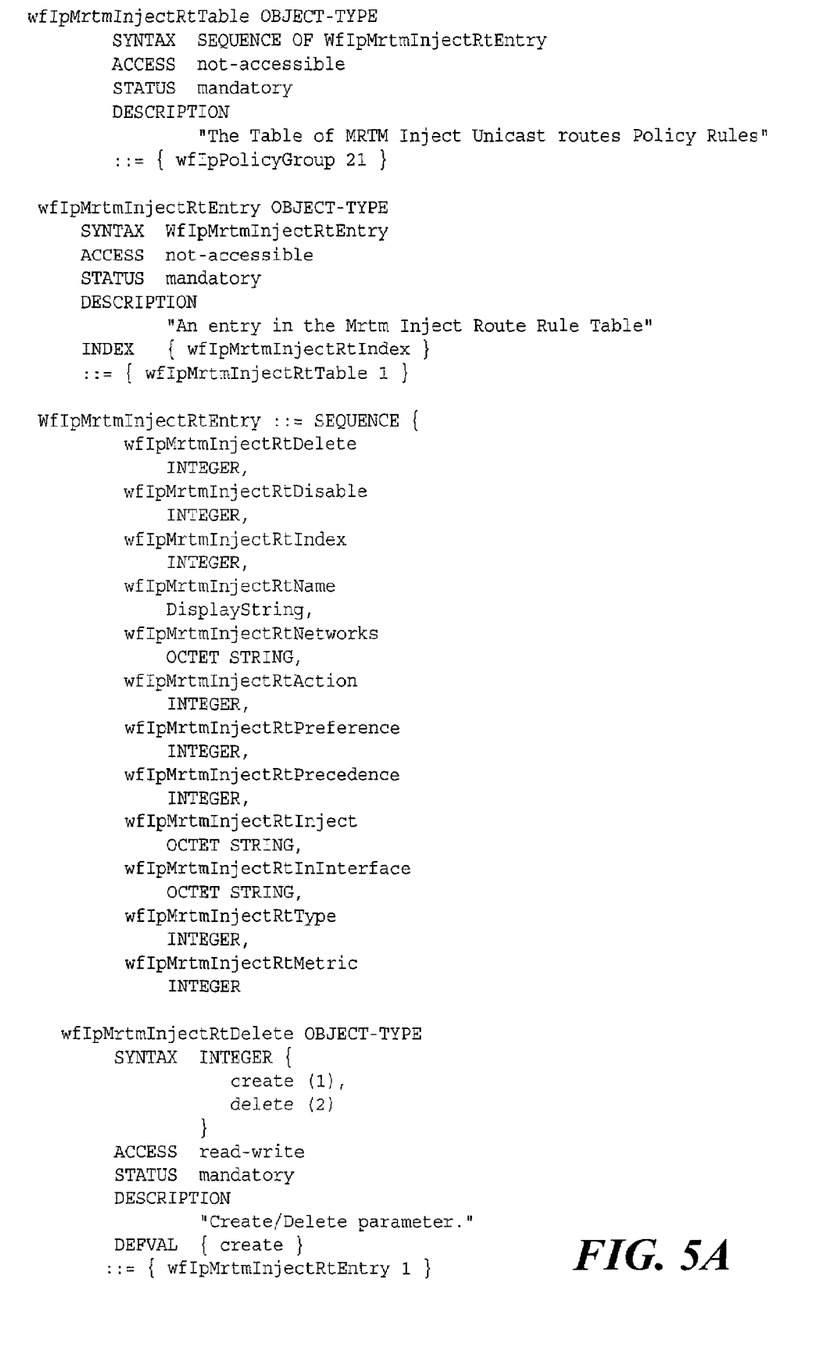
FIGS. 5A–5G show an exemplary management information base for managing a multicast routing table manager in accordance with an embodiment of the invention.
Figure 5B:
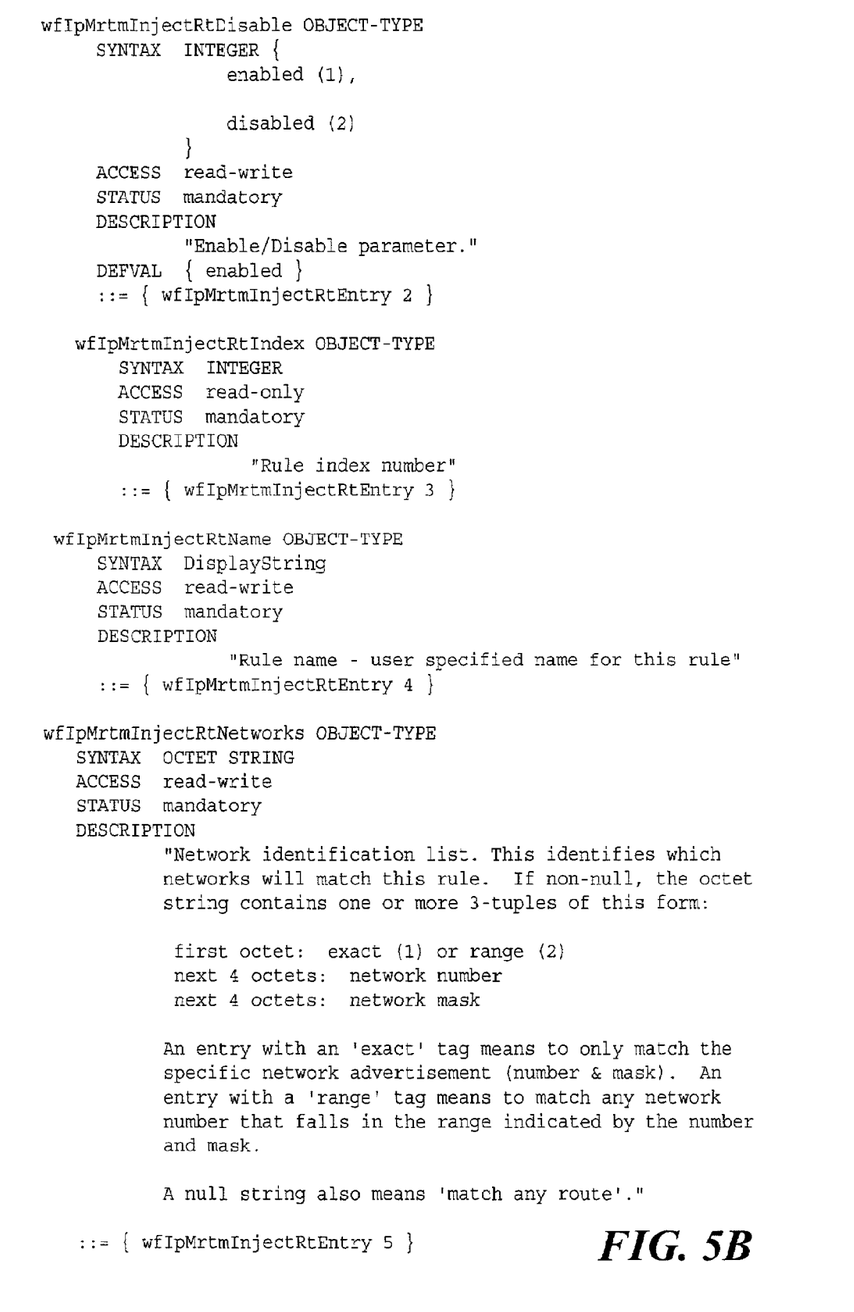
Figure 5C:
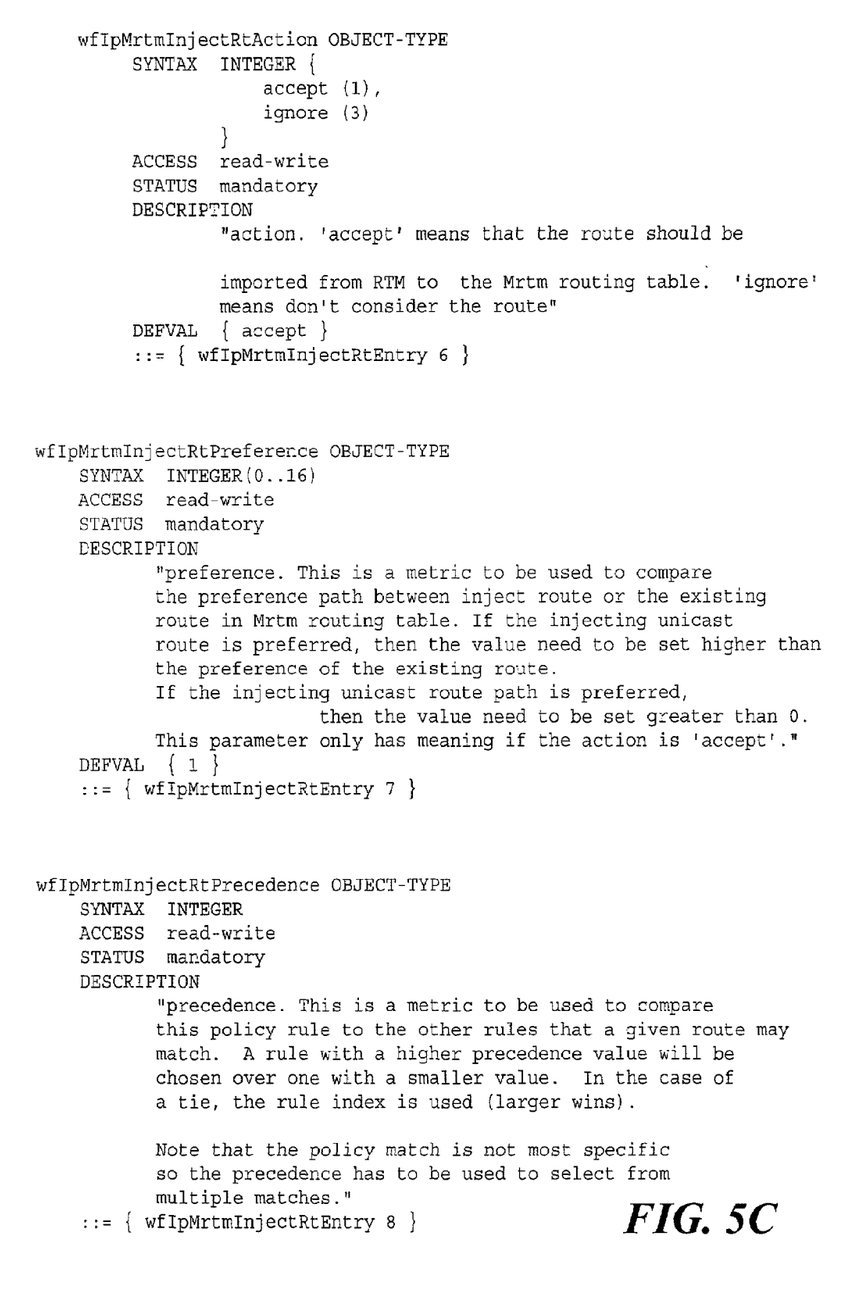
Figure 5D:
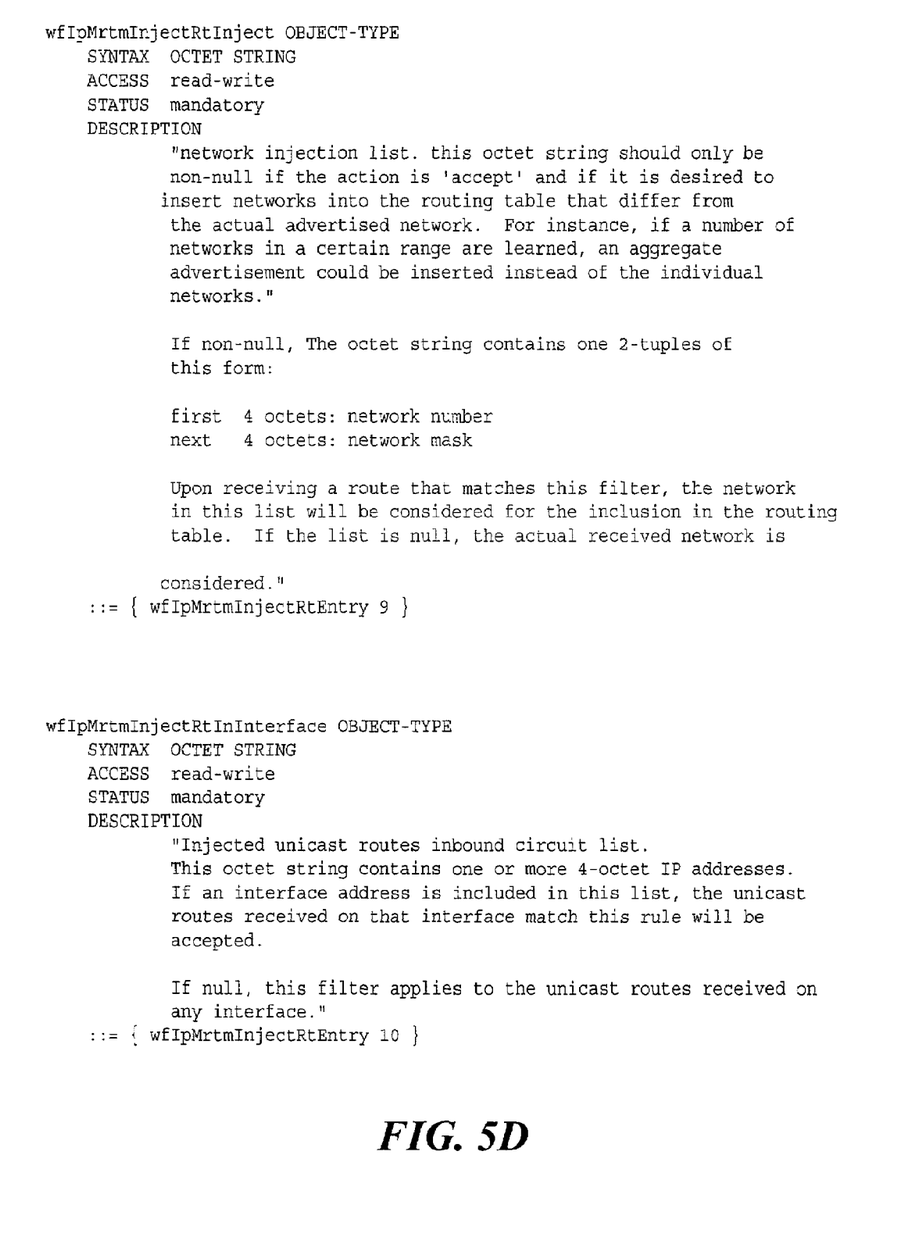
Figure 5E:
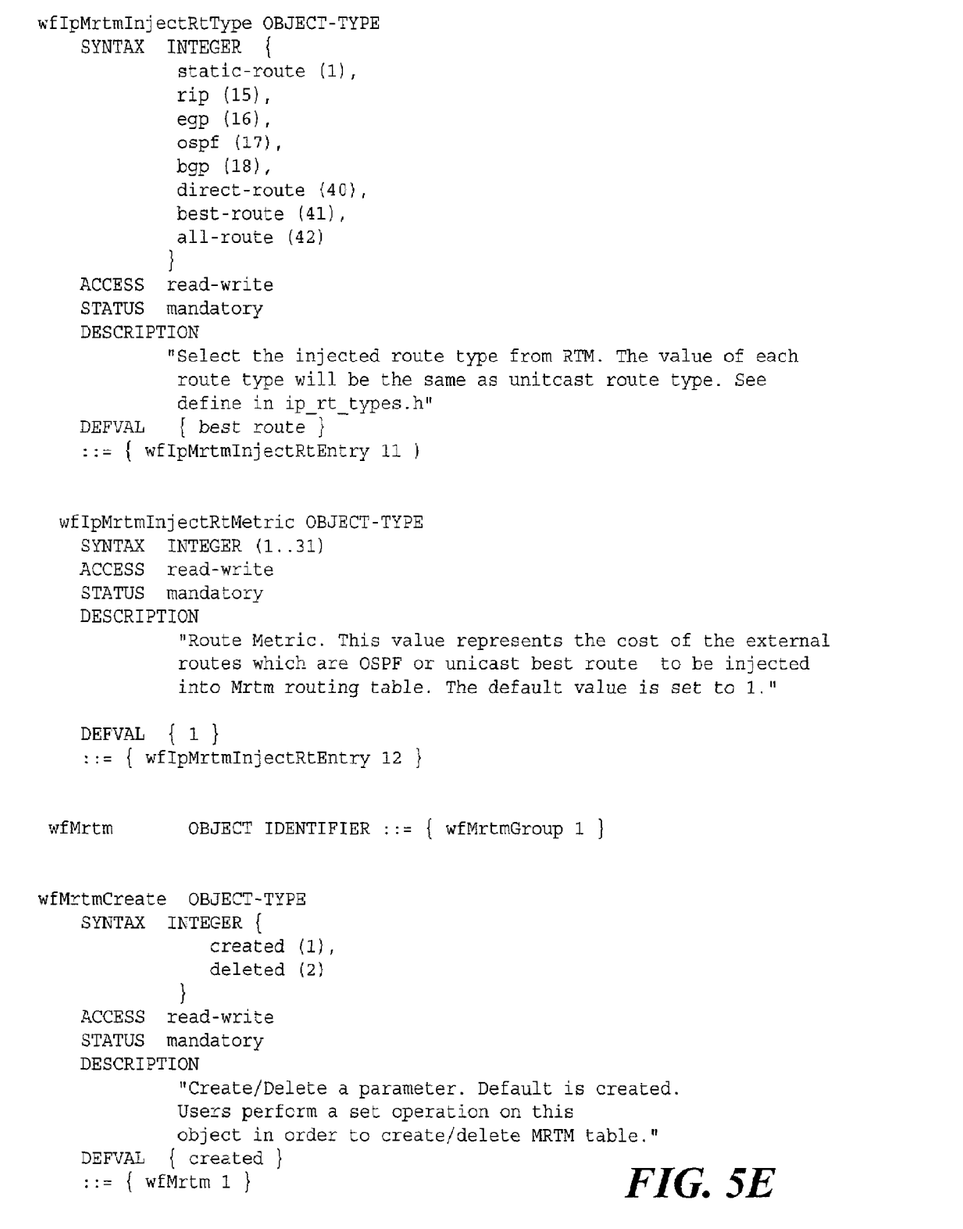
Figure 5F:
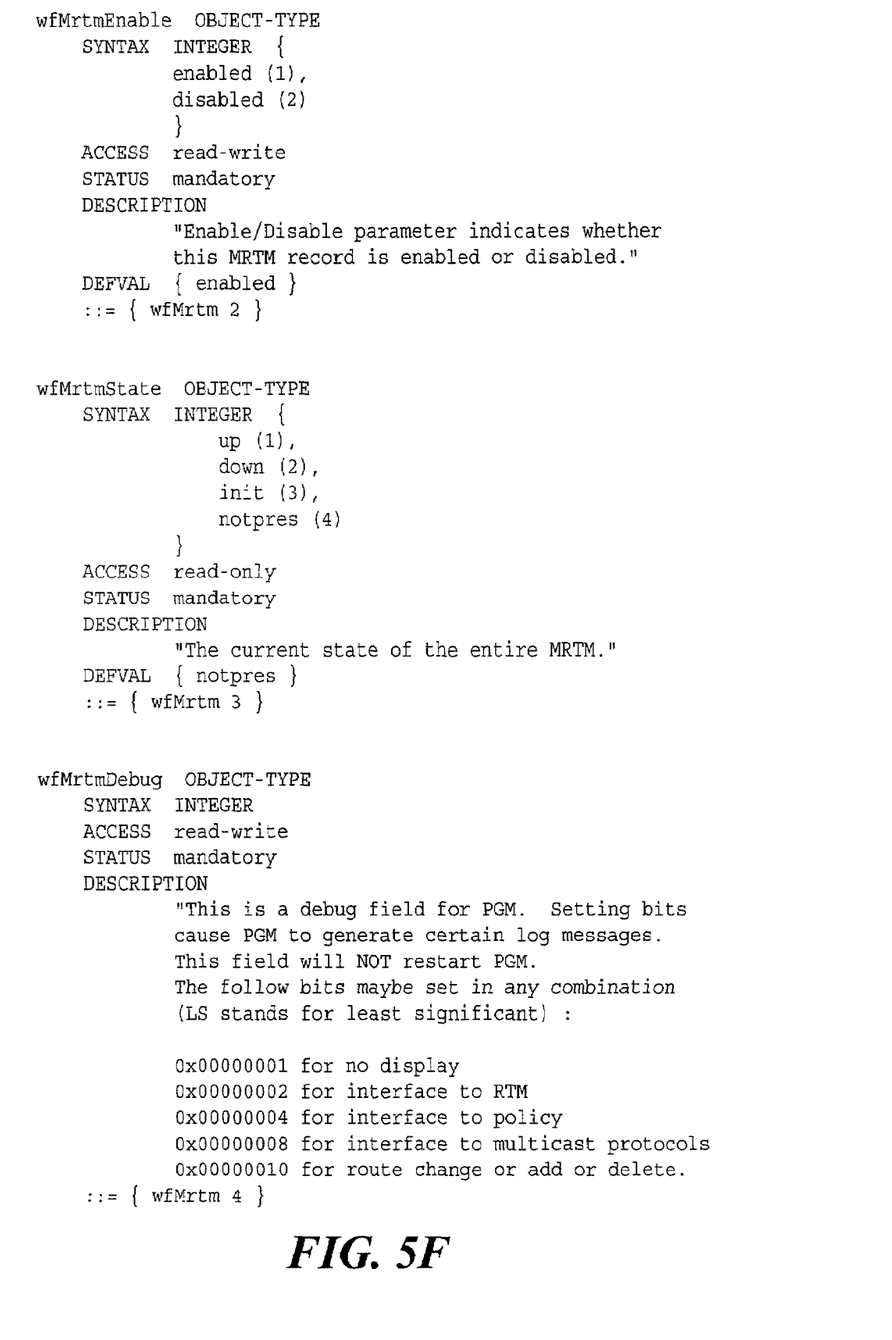
Figure 5G:
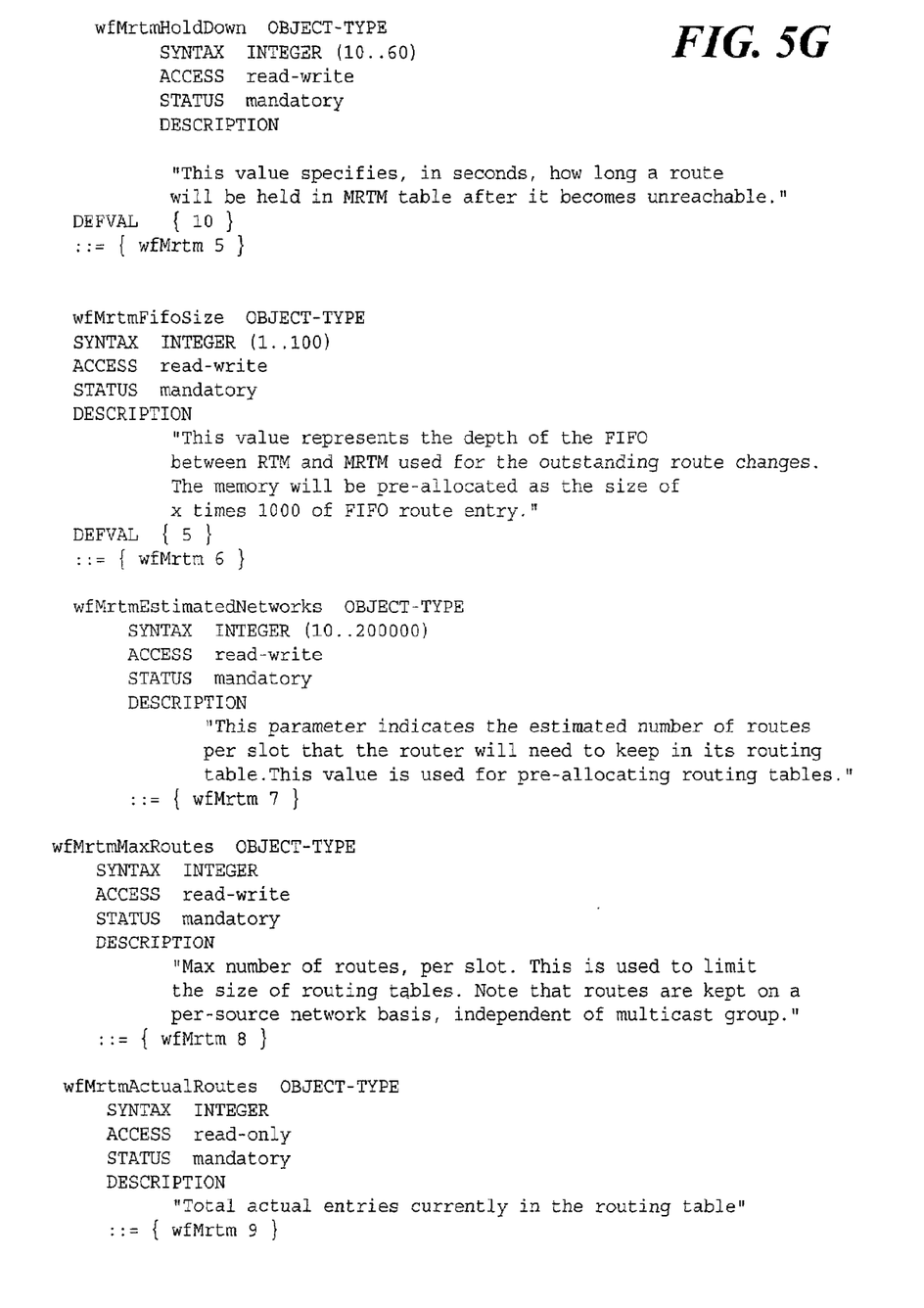

The exemplary MIB of FIGS. 5E–5G also defines management objects to configure and control the MRTM (routing) table (wfMrtm) and includes a management object (wfMrtmCreate) to create or delete the MRTM logic, a management object (wfMrtmEnable) to enable or disable the MRTM logic, a management object (wfMrtmState) indicating the current state of the entire MRTM, a management object (wfMrtmDebug) for generating log messages, a management object (wfMrtmHoldDownTime) indicating how long a route will be held in the MRTM table after it becomes unreachable, a management object (wfMrtmFifoSize) indicating the size of the FIFO used to transfer unicast routes from the RTM to the MRTM, a management object (wfMrtmEstimatedNetworks) indicating the estimated number of routes the router will need to keep in its routing table, a management object (wfMrtmMaxRoutes) indicating the maximum number of routes per slot, and a management object (wfMrtmActualRoutes) indicating the total actual entries currently in the routing table.

In a preferred embodiment of the invention, predominantly all of the logic for synchronizing a route change in a routing table with a plurality of multicast routing protocols in a network device is implemented as a set of computer program instructions that are stored in a computer readable medium and executed by an embedded microprocessor system within the router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

It should be noted that the term "packet" is used herein generically to describe various protocol messages that are processed by a communication device, and should not be construed to limit application of the present invention to a specific protocol message format or communication protocol. Thus, a "packet" may be any protocol message including, but not limited to, a frame, a packet, a datagram, a user datagram or a cell.

It should also be noted that the terms "router" and "switch" are used herein generically to describe any of a variety of devices that implement the described protocols and procedures for forwarding a multicast packet, and should not be construed to limit application of the present invention to any specific type of device.

Thus, the present invention may be embodied as a method for synchronizing a route change in a routing table with a plurality of multicast routing protocols in a network device in a communication network. The method involves assigning a route ID value to each route in the routing table, assigning a bookmark in a route change queue to each multicast routing protocol where the bookmark has a value equivalent to the route ID value of the last route processed by the routing protocol, assigning a new route ID value to each route changed in the routing table, storing the changed routes in the route change queue and comparing the bookmark value for each routing protocol to the highest route ID value in the route change queue.

The present invention may be embodied as a route entry for a route in a routing table for a plurality of multicast routing protocols. The route entry includes an address for the route source network, an address for the next hop of the route, an address for the next hop interface of the route, a route state value for indicating the current state of the route, a routing protocol identifier for identifying the routing protocol associated with the route and a route ID value for determining when the route entry has been processed by each of the plurality of multicast routing protocols.

The present invention may also be embodied as a computer program product comprising a computer readable medium having embodied therein a computer program for synchronizing a route change in a routing table with a plurality of multicast routing protocols in a network device in a communication network. The computer program product includes program code for assigning a route ID value to each route in the routing table, program code for assigning a bookmark in a route change queue to each routing protocol, program code for assigning a new route ID value to each route changed in the routing table, program code for storing each changed route in the route change queue and program code for comparing the bookmark value of each routing protocol to the highest route ID value in the route change queue.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method for synchronizing a route change in a routing table for a plurality of multicast routing protocols in a network device in a communication network device, the method comprising:
   assigning a route ID value to each route in the routing table;
   assigning a bookmark in a route change queue to each multicast routing protocol, the bookmark having a value equivalent to the route ID value of the last route processed by the multicast routing protocol, wherein the route change queue is separate from the routing table, and wherein the route change queue is shared across the plurality of multicast routing protocols;
   assigning a new route ID value to each route changed in the routing table;
   independently storing each route changed in both the routing table and the route change queue; and
   comparing the bookmark value of each multicast routing protocol to the highest route ID value in the route change queue.

2. A method according to claim 1, wherein the route change is the addition of a new route to the routing table.

3. A method according to claim 1, wherein the route change is the deletion of a route from the routing table.

4. A method according to claim 1, wherein the route change is updating a route in the routing table.

5. A method according to claim 1, further including processing routes in the route change queue with route ID values greater than the bookmark value of the multicast routing protocol.

6. A method according to claim 1, wherein each route changed comprises a route entry for a route in the routing table for the plurality of multicast routing protocols, the route entry comprising:
   an address for the route source network;
   an address for the next hop of the route;
   an address for the next bop interface of the route;
   a route state value for indicating the current state of the route;
   a routing protocol identifier for identifying the routing protocol associated with the route; and
   the new route ID value, wherein the new route ID value is further for determining when the route entry has been processed by each of the plurality of multicast routing protocols.

7. A computer program product for use on a computer system for synchronizing a route change in a routing table with a plurality of multicast routing protocols in a network device in a communication network, the computer program product comprising a computer useable medium having a computer readable program code thereon, the computer readable program code including:
   program code for assigning a route ID value to each route in the routing table;
   program code for assigning a bookmark in a route change queue to each multicast routing protocol, the bookmark having a value equivalent to the route ID value of the last route processed by the multicast routing protocol, wherein the route change queue is separate from the routing table, and wherein the route change queue is shared across the plurality of multicast routing protocols;
   program code for assigning a new route ID value to each route changed in the routing table;
   program code for independently storing each route changed in both the routing table and the route change queue; and
   program code for comparing the bookmark value of each multicast routing protocol to the highest route ID value in the route change queue.

8. A computer program product according to claim 7, wherein the route change is the addition of a new route to the routing table.

9. A computer program product according to claim 7, wherein the route change is the deletion of a route from the routing table.

10. A computer program product according to claim 7, wherein the route change is updating a route in the routing table.

11. A computer program product according to claim 7, further including program code for processing routes in the route change queue with route ID values greater than the bookmark value of the multicast routing protocol.

* * * * *